(12) United States Patent
Winograd et al.

(10) Patent No.: US 12,522,036 B2
(45) Date of Patent: Jan. 13, 2026

(54) SMART NOSE BOX

(71) Applicant: Phillips Connect Technologies LLC, Santa Fe Springs, CA (US)

(72) Inventors: Gil Winograd, Aliso Viejo, CA (US); Jim Epler, Irvine, CA (US); Adam Bean, Hacienda Heights, CA (US); Thomas Peterson, Glendora, CA (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 627 days.

(21) Appl. No.: 17/890,895

(22) Filed: Aug. 18, 2022

(65) Prior Publication Data

US 2022/0388359 A1 Dec. 8, 2022

Related U.S. Application Data

(63) Continuation of application No. PCT/US2021/019121, filed on Feb. 22, 2021.

(60) Provisional application No. 62/980,043, filed on Feb. 21, 2020.

(51) Int. Cl.
*H01R 31/00* (2006.01)
*B60D 1/64* (2006.01)
*B60R 16/023* (2006.01)
*H05K 5/00* (2006.01)

(52) U.S. Cl.
CPC ............ *B60D 1/64* (2013.01); *B60R 16/0239* (2013.01); *H05K 5/0026* (2013.01)

(58) Field of Classification Search
CPC ..... B60D 1/64; B60R 16/0239; H05K 5/0026
See application file for complete search history.

(56) References Cited

U.S. PATENT DOCUMENTS

| | | | | |
|---|---|---|---|---|
| 4,897,642 A * | 1/1990 | DiLullo | ............... | G01S 5/0009 701/1 |
| 5,488,352 A * | 1/1996 | Jasper | ............... | H01R 13/6633 280/423.1 |
| 5,854,517 A * | 12/1998 | Hines | ................... | B60T 8/1708 340/12.32 |
| 5,920,128 A * | 7/1999 | Hines | ................... | B60T 8/1708 340/12.32 |
| 6,007,346 A * | 12/1999 | Gutierrez | ............... | H01R 29/00 439/35 |
| 6,558,167 B2 * | 5/2003 | Harmon | .................. | B60D 1/62 439/35 |
| 7,348,878 B2 | 3/2008 | Fogelstrom | | |
| 7,435,093 B1 | 10/2008 | Harmon et al. | | |
| 7,643,271 B2 | 1/2010 | Phillips et al. | | |
| 10,688,839 B1 * | 6/2020 | Slade | ...................... | B60D 1/64 |
| 2017/0171952 A1 | 6/2017 | Troutman | | |
| 2018/0293891 A1 * | 10/2018 | Troutman | ............... | G08G 1/13 |

OTHER PUBLICATIONS

Office Action—Application No. MX/a/2022/010343—Jul. 29, 2025.

* cited by examiner

*Primary Examiner* — Abdullah A Riyami
*Assistant Examiner* — Nelson R. Burgos-Guntin
(74) *Attorney, Agent, or Firm* — Haynes and Boone, LLP

(57) ABSTRACT

A smart nose box is provided that includes both a housing portion and a lid portion. The housing portion includes monitoring circuits for monitoring the health of lamps in a towable asset. The lid portion includes a battery, a GPS receiver, and a telematics transceiver.

20 Claims, 6 Drawing Sheets

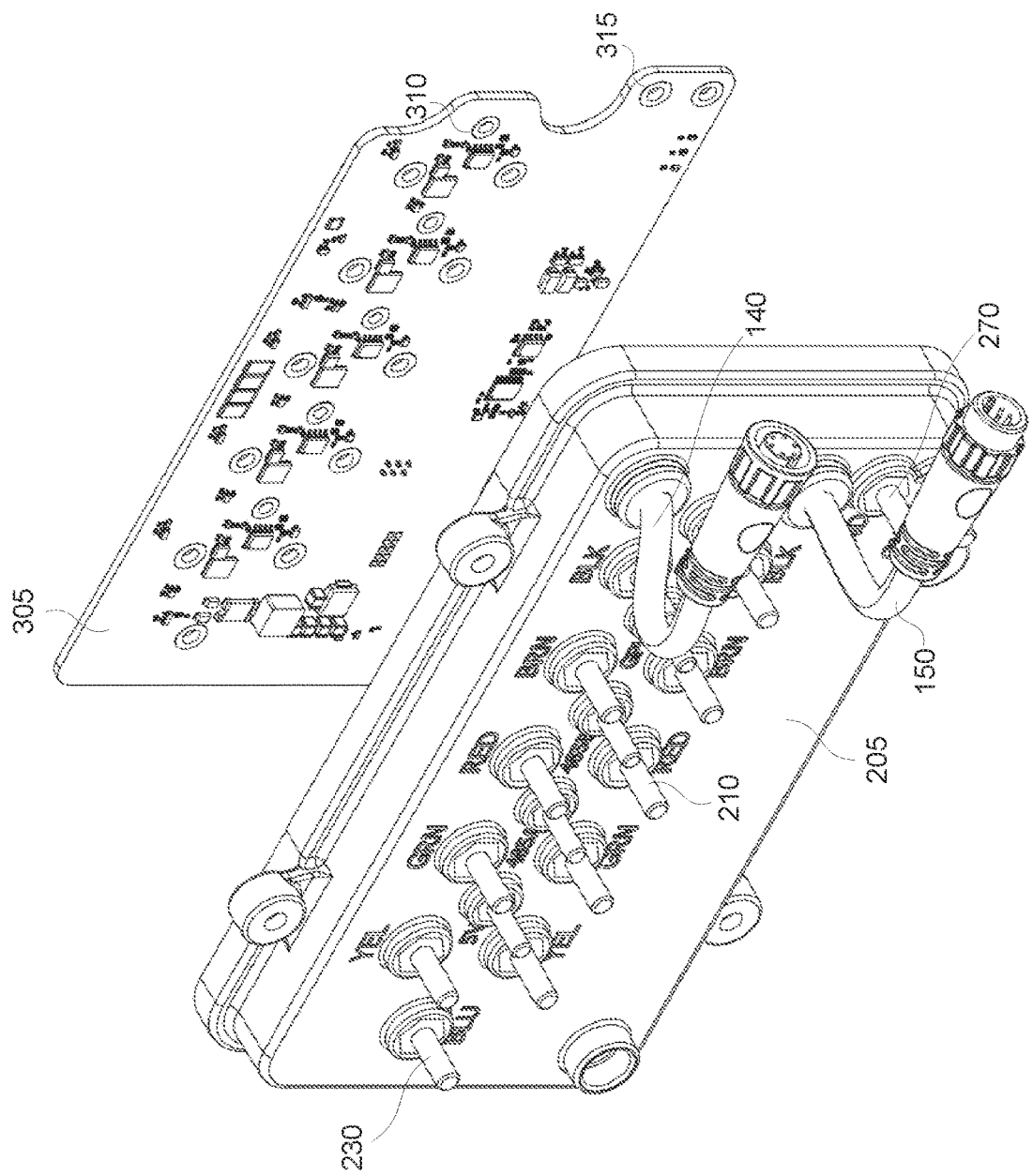

SMART NOSE BOX

CROSS-REFERENCE TO RELATED APPLICATION(S)

This application claims priority to International Application No PCT/US2021/19121, filed Feb. 22, 2021, which in turn claims the benefit of U.S. provisional Application No. 62/980,043, filed on Feb. 21, 2020, the contents of both of which are hereby incorporated herein by reference in their entirety.

TECHNICAL FIELD

The present invention relates to a nose box for a towable asset, and more particularly, to a smart nose box integrating a telematics transceiver.

BACKGROUND

The design of the tractor in a tractor-trailer varies depending upon the region but regardless of the design, it is conventional to use a J-560 interface (commonly referred to as a 7-way coupler) on the semi-trailer or other type of towable asset to ease the connection and disconnection of the trailer from the tractor. As implied by the name, a 7-way coupler includes 7 pins or terminals. One pin is for ground. The remaining six pins are conventionally used to drive the tail and running lights and the marker lights, the license plate light, an auxiliary circuit such as an anti-lock brake (ABS) unit, the left turn signal, the right turn signal, and the stop lights, respectively.

The proper functioning of these various lights and circuits is vital for public safety. Various monitors have thus been developed that may wirelessly report the operating status of the lights and circuits in the trailer. But the ease of integration of such monitors is an issue. Similarly, various telematic reporting systems have been developed for the trucking industry. Customers may have thousands of rigs so the costs of retrofitting them to include monitors and telematics must be minimized.

SUMMARY

A nose box is provided that includes: a housing; a platform within the housing, the platform including a first plurality of terminals for receiving lamp power signals from a tractor, a second plurality of terminals for transmitting the lamp power signals to a towable asset, and an auxiliary terminal for providing power to an auxiliary circuit in the towable asset; a housing circuit board associated with the platform, the housing circuit board including a plurality of lamp monitoring circuits, a housing circuit board associated with the platform, the housing circuit board including a plurality of lamp monitoring circuits, each lamp monitoring circuit being configured to conduct a current from a respective terminal from the first plurality of terminals to a respective terminal from the second plurality of terminals and to measure the current to determine an operating condition of a respective lamp in the towable asset; and a lid for enclosing an interior of the housing, the lid including an inner cover configured to enclose a battery and a lid circuit board including a telematics transceiver and a power management circuit configured to power the telematics transceiver from the auxiliary post when the auxiliary terminal has power and to power the telematics transceiver from the battery when the auxiliary terminal does not have power.

In addition, a method of operating a nose box is provided that includes: receiving a plurality of lamp power signals at a first plurality of posts; conducting each lamp power signal from a respective post in the first plurality of posts through a respective monitoring circuit to a respective post in the second plurality of posts to measure a voltage and a current of each lamp power signal to determine a status of a plurality of lamps in a towable asset; receiving an auxiliary power signal at an auxiliary power post and distributing the auxiliary power signal from the auxiliary power post to an auxiliary circuit in the towable asset; performing a power line communication with the auxiliary circuit using the auxiliary power signal to obtain a status of the auxiliary circuit; and transmitting the status of the plurality of lamps and the status of the auxiliary circuit through a telematics transceiver to a user.

Finally, a nose box for a towable asset is provided that includes: a housing including a plurality of lamp terminals and an auxiliary power terminal; a battery; a telematics transceiver; a power management circuit; and a lid for enclosing the plurality of lamp terminals and the auxiliary power terminal within the housing, the lid including an inner cover configured to enclose the battery, the telematics transceiver, and the power management circuit, wherein the power management circuit is configured to charge the battery from the auxiliary power terminal while the auxiliary power terminal has power, and wherein the power management circuit is further configured to power the telematics transceiver during an activity period using the battery while the auxiliary power terminal has no power.

These and additional advantageous features of the disclosed embodiments may be better appreciated through a consideration of the following detailed description.

BRIEF DESCRIPTION OF THE DRAWINGS

FIG. 3A is a perspective exploded view of a post platform and the associated circuit board for a smart nose box in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

To provide improved monitoring and telematics, a smart nose box is provided that integrates the circuit monitoring, telematics, and a power line communication receiver. The following description will be directed to nose boxes compatible with the Phillips i-Box™ form factor or the Phillips S7™ form factor. However, it will be appreciated that any suitable nose box form factor may benefit from the principles and techniques disclosed herein.

Figure 1:
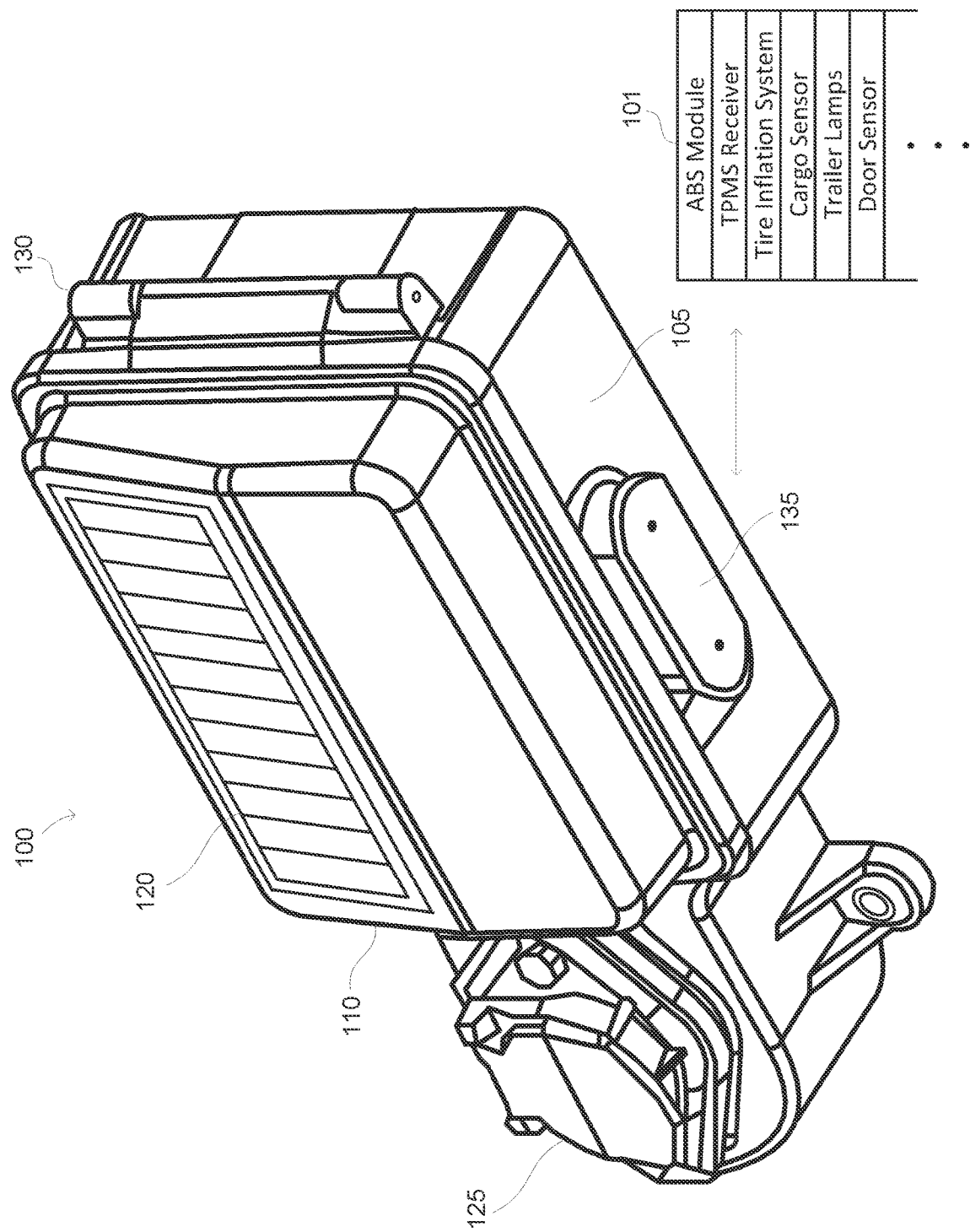
FIG. 1 is a perspective view of a smart nose box with its lid closed in accordance with an aspect of the disclosure.

An example smart nose box 100 that is compatible with the Phillips i-Box™ form factor is shown in FIG. 1. A housing 105 includes J-560 coupler such as a Phillips Quick-Change socket QCS2® 125 that when opened may receive a 7-way coupler from the tractor. As implied by the term "nose," smart nose box 100 is placed at the front of a trailer. As used herein, the term "trailer" is used generically to refer to a semi-trailer, a chassis, a flat bed, or any other suitable towable asset that may be towed by the tractor and receive the tractor's 7-way coupler. In that regard, the terms "trailer" and "towable asset" are used interchangeably herein. Housing 105 includes a lid 110 that may be rotated away from housing 105 on an axis 130 to expose an inner surface of lid 110 and an interior of housing 105. Lid 110 may also include a solar panel 120 on its outer surface for recharging of a battery in smart nose box 100 as will be discussed further herein. Housing 105 includes a removable grommet 135 so that a 7-way harness and other leads may exit housing 105 and extend to their trailer destinations.

Smart nose box 100 is configured to monitor various components 101 in the towable asset such as the ABS module, a tire pressure monitoring system (TPMS) receiver, a tire inflation system, a cargo sensor, trailer lamps, a door sensor, and so on. Information regarding the status or signals from these components may be transmitted to a user by a telematics transceiver in smart nose box 100 as will be explained further herein. The status for a monitored component may include whether the component is operative, inoperative, open circuited, short circuited and so on.

Figure 2:
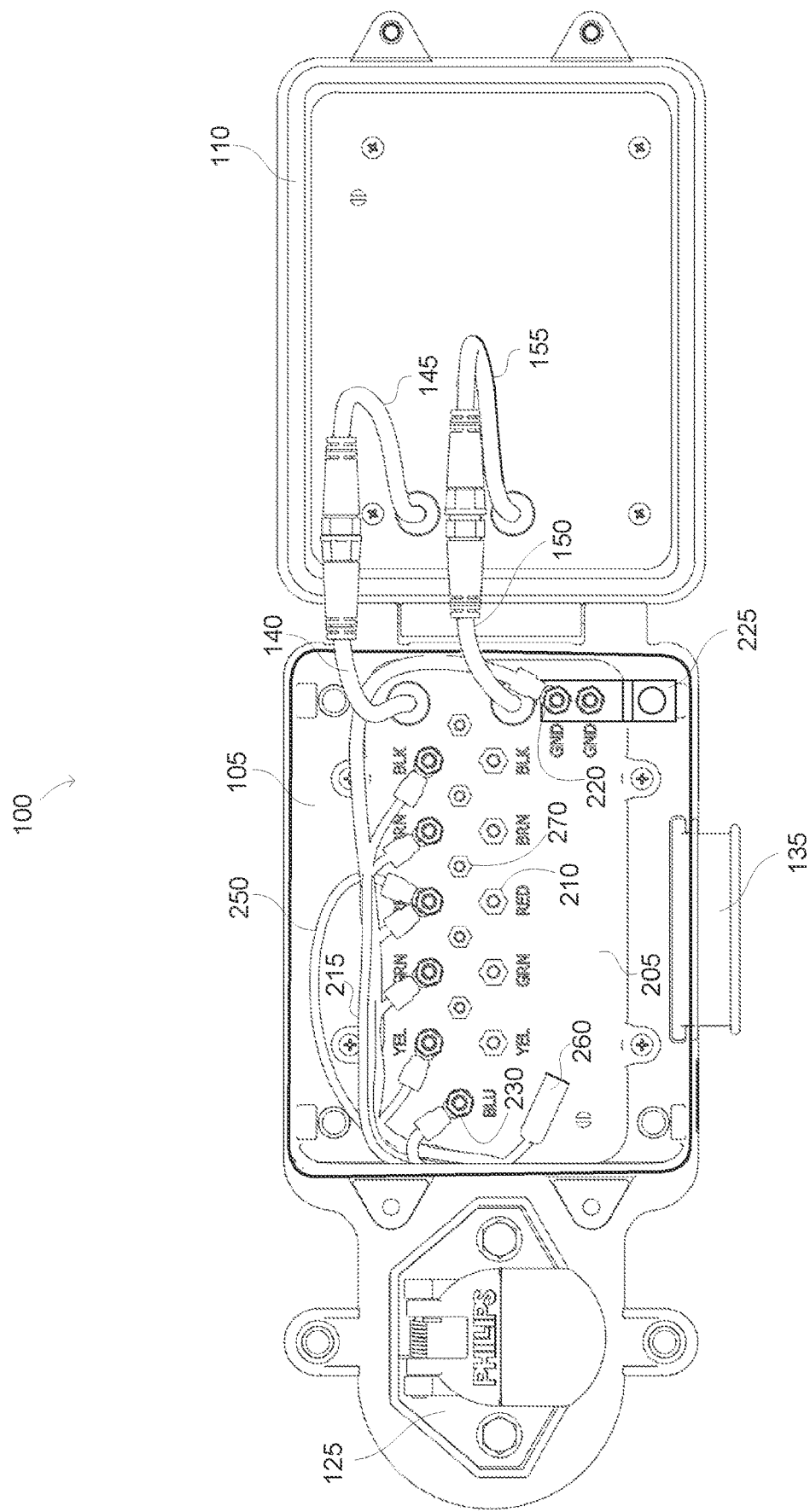
FIG. 2 is a plan view of a smart nose box with its lid opened in accordance with an aspect of the disclosure.

Nose box 100 is shown in FIG. 2 with the lid 110 opened away from housing 105 to expose a platform 205 in the interior of housing 105. A 7-way wiring harness 215 is shown that connects between corresponding pins or terminals in the J-560 coupler 125 and corresponding posts 210 on platform 205. In some embodiments, there are three rows of posts 210. A top row of posts 210 receives the red, black, brown, green, and yellow wires from 7-way wiring harness 215. Each wire connects to a corresponding post 210. As known in the 7-way wiring arts, red is for the brake/stop lights, black is for the license plate lighting, brown is for the marker lights, green is for the left turn signal light, and yellow is for the right turn signal light. The corresponding lights in the trailer may also be denoted as lamps.

The top row of posts 210 receives the red, black, brown, green, and yellow wires from 7-way wiring harness 215. The red, black, brown, green, and yellow wires from a trailer 7-way wiring harness (not illustrated) connect to the bottom row of posts 210. The top row of posts 210 may thus be denoted as the upstream (tractor-side) posts whereas the bottom row of posts 210 may be denoted as the downstream (trailer-side) posts. This separation between upstream and downstream posts on the circuit board 305 is quite advantageous with regard to the monitoring of the corresponding lamps as will be further discussed herein.

7-way wiring harness 215 also includes a ground wire (which is typically colored white) that connects to a ground post 220. Platform 205 may include two ground posts 220 that are shorted to each other through a ground strap or plate 225. In addition, 7-way wiring harness 215 includes a blue wire that couples to an auxiliary post 230 on platform 205 for powering an auxiliary circuit within the trailer. Each of posts 210, 220, and 230 may be threaded so that a wire fitting may be connected to the post by a nut or fastener that is screwed down on the threads. The blue wire in the 7-way wiring harness 215 as well as the corresponding blue wire in the trailer's 7-way wiring harness both share auxiliary post 230. This is advantageous with regard to an accurate monitoring of the brake lights as will be explained further herein.

Figure 3B:
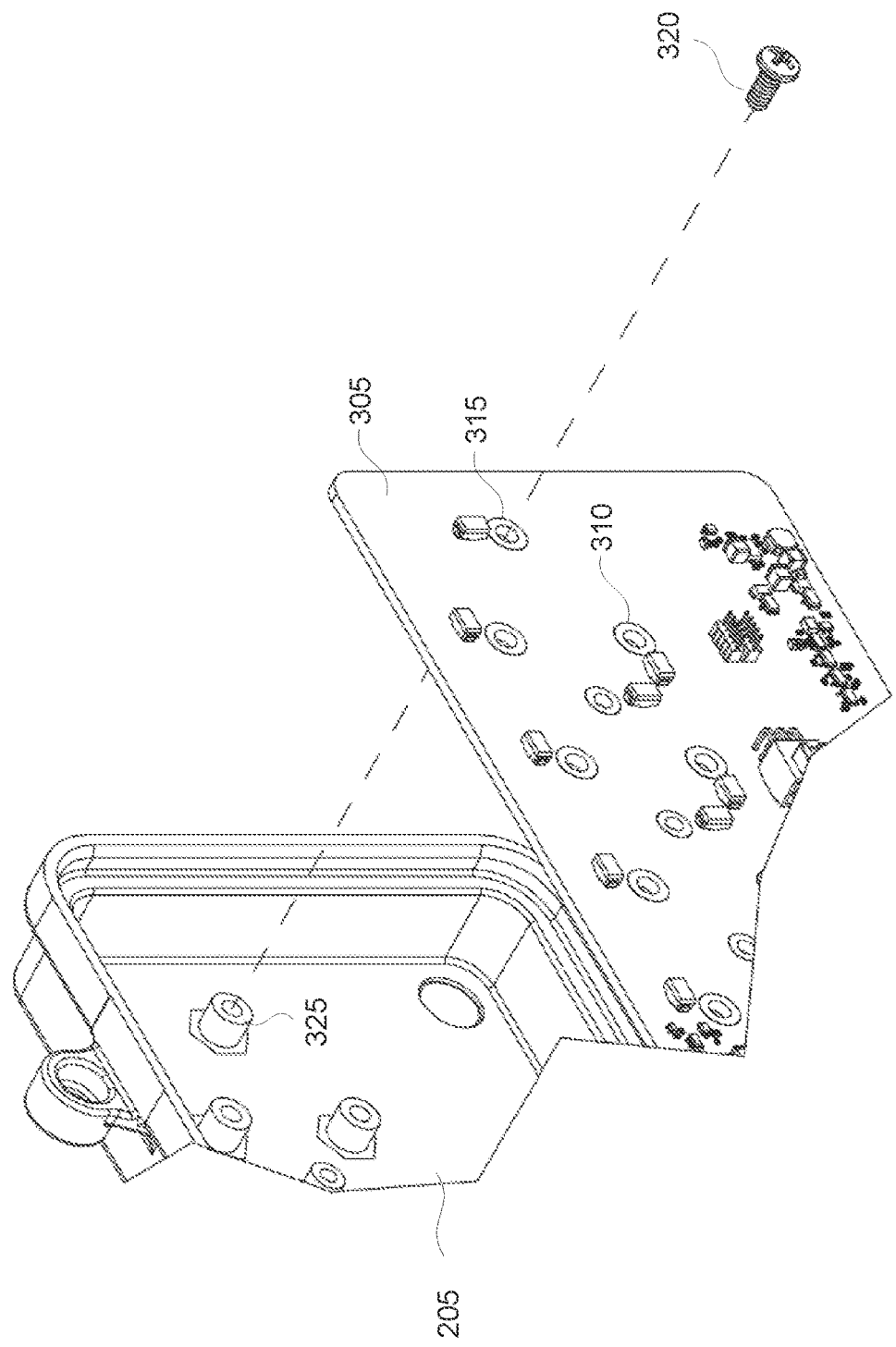
FIG. 3B is a perspective view exploded view, partially cut-away, of the trailer side of the post platform and circuit board of FIG. 3A.

A housing circuit board 305 is affixed to a back side of platform 205 as shown in the exploded view of FIG. 3A. Housing circuit board 305 includes a circular aperture 310 for each of posts 230, 210, and 220. Each circuit aperture 310 is surrounded by a conductive ring 315 on housing circuit board 305. Platform 205 and housing circuit board 305 are shown in FIG. 3A from the perspective of the tractor. This side of the housing circuit board 305 may be denoted as the front side whereas a back side faces the trailer. A partially cut-away exploded view of the back side of housing circuit board 305 and platform 205 from the perspective of the trailer is shown in FIG. 3B. It may thus be seen that the posts extend through platform 205 to project from the backside of platform 205 and include threaded bores 325. A screw 320 for each post extends from the backside of housing circuit board 305 through an aperture 310 to be received in the post's threaded bore 325. As also seen in FIG. 3B, the backside of housing circuit board 305 may also include a conductive ring 315 surrounding each aperture 310. The resulting fastening of circuit board 305 to posts 210, 230, and 220 (FIG. 3A) is quite advantageous in that no soldering is necessary. Despite the lack of soldering, circuitry on both the front and back sides of housing circuit board 305 can electrically couple to each post through a circuit board contact to the corresponding conductive ring 315. Note that conductive rings 315 may be placed on just one circuit board surface around an aperture 310 in alternate embodiments as vias may be used that conduct from one side of the housing circuit board surface to another to allow circuitry on both sides of the housing circuit board to electrically couple to the conductive ring 315 and thus to the corresponding post. Note that the post platform 205 is configured to seal housing circuit board 305 within housing 105 to protect housing circuit board 305 from the elements.

Figure 4:
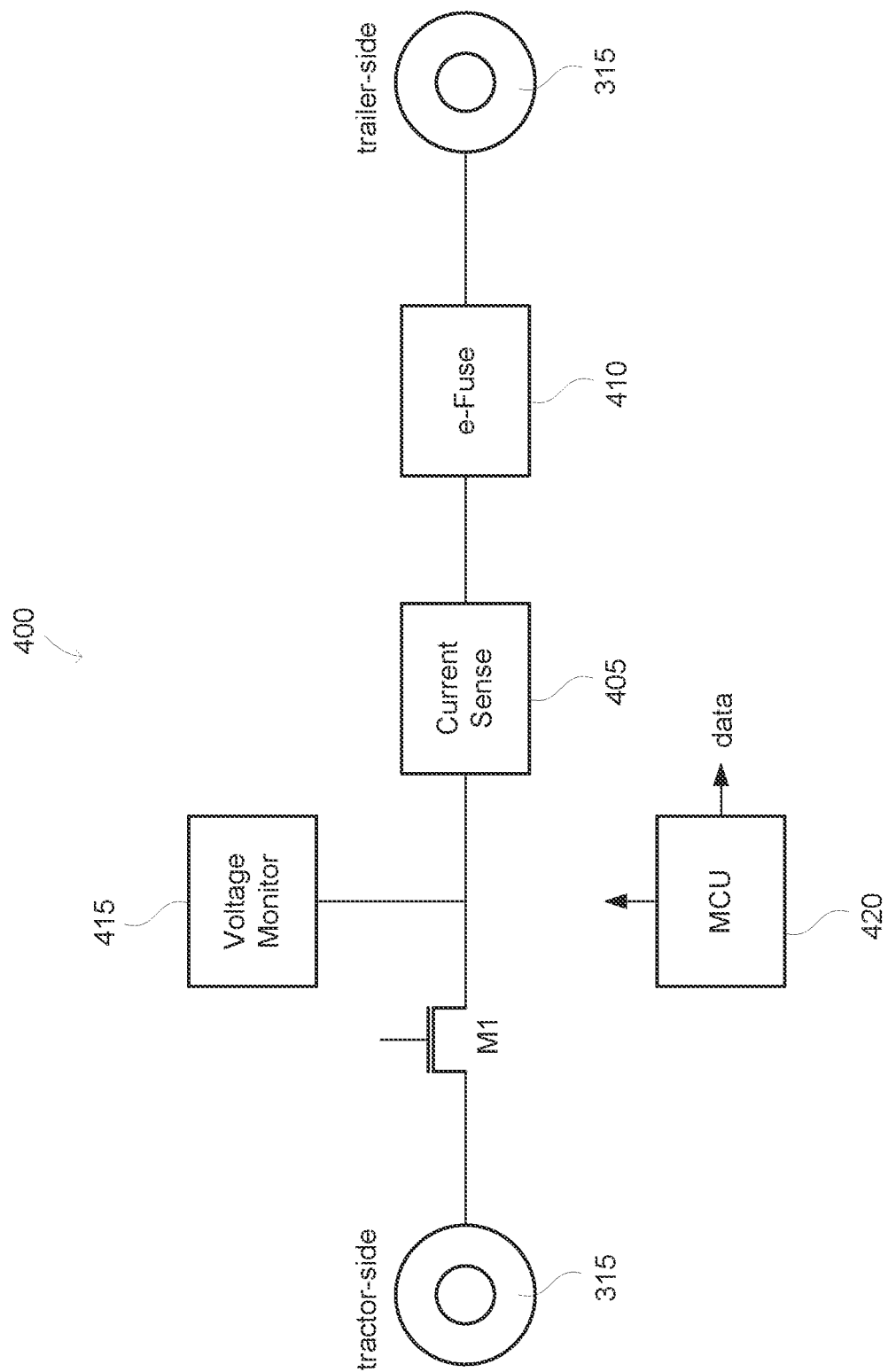
FIG. 4 illustrates a lamp monitoring circuit for the circuit board of FIGS. 3A and 3B in accordance with an aspect of the disclosure.

The electrical coupling to each post is advantageous with regard to monitoring the lamps using circuitry on housing circuit board 305. For example, consider a monitoring circuit 400 as shown in FIG. 4 that couples between a tractor-side conductive ring 315 (corresponding to one of the posts 210 in the top row of the posts in FIG. 2) to a trailer-side conductive ring 315 (corresponding to one of the posts 210 in the bottom row of the posts). Each monitoring circuit 400 would be integrated onto either the front side or the back side of housing circuit board 305. In monitoring circuit 400, each of the corresponding posts 210 would correspond to the same lamp. There would thus be a monitoring circuit 400 between the red wire posts 210 for the brake lights, another for the marker lights between the brown wire posts 210, and so on for the remaining lamps. Each monitoring circuit 400 includes a switch such as an NMOS transistor M1 that is upstream of a current sense circuit 405 and a voltage monitor 415. Current sense circuit 405 may be a Hall sensor or may be a sense resistor. In addition, monitoring circuit 400 includes a fuse such as an e-fuse 410 to protect the trailer lamp from excessive currents.

A controller such as a microcontroller (MCU) 420 on housing circuit board 305 determines the health of the lamp being driven by monitoring circuit 400 by monitoring the sensed voltage and the sensed current. Should the MCU 420 detect that the voltage is too low, a problem is detected with regard to the power signal coming from the trailer. On the other hand, if the voltage is normal (typically 12 V) but the current is too low, either the corresponding lamp is malfunctioning or broken. MCU 420 may then report the health of the corresponding lamp to a user using a telematics transceiver in lid 110 as will be explained further herein.

Referring again to FIG. 2, note that the auxiliary post 230 is used to power an auxiliary circuit in the trailer such as an anti-lock-brake (ABS) module. The current draw of such a module is variable depending upon the mode of the ABS module. Housing circuit board 305 thus does not need a monitoring circuit 400 for auxiliary post 230 such that there is no need for a trailer-side auxiliary post 230 and a tractor-side auxiliary post 230. Circuit board 305 may include a voltage monitor to verify whether the auxiliary post 230 is receiving the proper voltage from the tractor (e.g., 12 V).

To provide extra robustness for powering an ABS module, it is known to power the ABS module through both the trailer's blue wire and its red wire. In this fashion, if the auxiliary power from the tractor is absent such as due to a blown fuse, the ABS module will still be powered every time the brakes are applied from the resulting powering of the trailer's red wire. To accommodate this practice, the trailer-side red post in the top row of posts as shown in FIG. 2 also couples to a wire 250 that ends in a coupler 260. A tractor-side wire (not illustrated) couples to coupler 260 and extends through grommet 135 to provide back-up power to the ABS module. Note that wire 250 does not couple to the trailer-side red post 210 because such a coupling would corrupt the current measurement by the monitoring circuit 400 for the brake lights should the ABS module draw power from the trailer's red wire instead of from the trailer's blue wire.

The voltage of auxiliary post 230 and the voltage/current health of the lamps as monitored by monitoring circuits 400 may be reported by MCU 420 to drive a data cable 140 that couples to a corresponding data cable 145 that is received by a telematics unit in lid 110. Various other data signals may also be propagated through data cables 140 and 145. A power and ground cable 150 couples from housing circuit board 305 to a coupler to drive a corresponding power and ground cable 155 for the telematics unit in lid 110.

Figure 5:
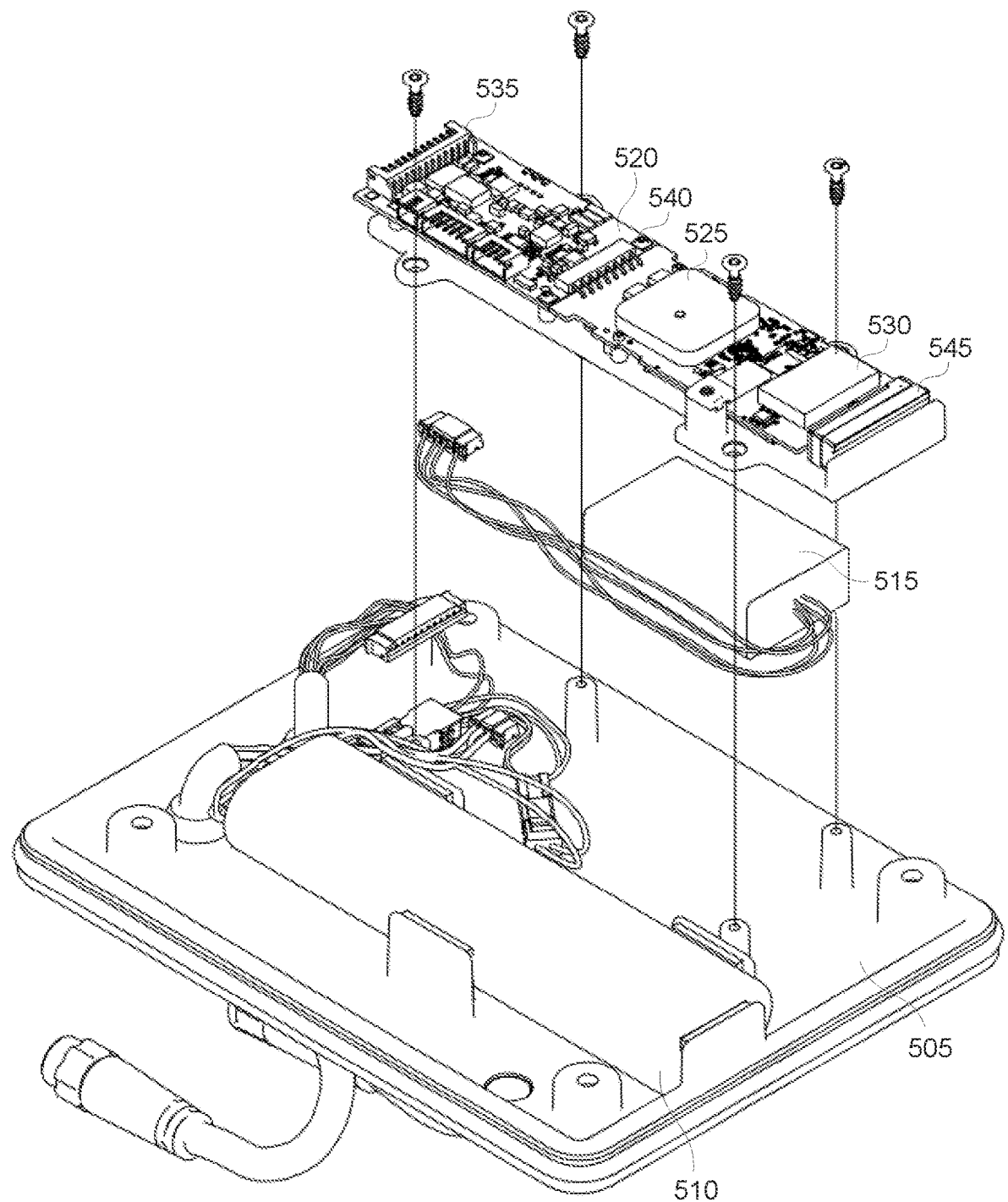
FIG. 5 is a trailer-side perspective exploded view of an inner cover for a smart nose box lid and associated circuitry in accordance with an aspect of the disclosure.

A trailer-side exploded view of an inner cover 505 for lid 110 is shown in FIG. 5. To allow the reporting of telematics while the trailer is disconnected from a tractor, inner cover 505 supports a rechargeable battery 510 (e.g., a lithium-ion battery). A lid circuit board 520 is attached to inner cover 505 and includes a telematics transceiver 525. Any suitable wireless technology may be used for telematics transceiver 525 including cellular or WiFi. A cellular telematics transceiver 525 is particularly convenient due to the omnipresence of cellular coverage at virtually all warehouse locations and also due to the range of a cellular connection. The following discussion will thus assume that telematics transceiver 525 is a cellular transceiver.

To conserve power, the default mode of telematics transceiver 525 is a sleep mode in which telematics transceiver 525 is powered down. Telematics transceiver 525 may be scheduled to periodically wake-up and check for commands from a user such as delivered over the internet (the "cloud") and then through a cellular connection to telematics transceiver 525. In addition, telematics transceiver 525 may be scheduled to periodically wake up to transmit data through the cellular link and through the cloud to a user. One form of data to report may be the position of the trailer such as determined through a GPS receiver 535 that is also integrated onto lid circuit board 520. In addition, lid circuit board 520 may include a local networking transceiver such as a Bluetooth transceiver 530 to receive data from Bluetooth-enabled sensors on the trailer. The trailer may include additional sensors and circuits that communicate with a controller (e.g., MCU 540) on lid circuit board 520.

With regard to this communication, platform 205 includes a center row of posts 270. A pair of posts 270 connect through housing circuit board 305 and data cables 140 and 145 to MCU 540. MCU 540 is configured to support a Control Area Network (CAN) bus transceiver for this pair of posts 270. A CAN bus routed from the trailer through grommet 135 may then be wired to this pair of posts 270 to couple to CAN-bus-enabled sensors in the trailer. Another pair of posts 270 may correspond to a RS 485 bus that is also routed to appropriate sensors in the trailer. The CAN bus and the 485 bus is also routed through data cables 140 and 145 to MCU 540. In this fashion, a wide variety of sensors in the trailer may be networked to MCU 540. For example, the TPMS receiver, a cargo sensor, a door sensor, a weight sensor, and so on may be networked to MCU 540. Other sensors may be networked to MCU 540 through a Bluetooth connection with Bluetooth transceiver 530.

In addition to the coupling through the CAN and proprietary buses for receiving data and sensor status, the trailer's auxiliary lead may be used to transmit data and commands using a power line communications (PLC) module 515. For example, the ABS module may report error conditions over the auxiliary lead to auxiliary post 230. Circuit board 305 receives auxiliary post 230 in a corresponding conductive ring 315 so that the auxiliary post PLC signaling may be coupled over data cables 140 and 145 to PLC module 515. PLC module 515 decodes the PLC signaling to provide the data to MCU 540 so that it may then be transmitted by the telematics transceiver 525 to a user in the cloud. Conversely, MCU 540 may transmit a query to PLC module 515 that is then translated to the PLC protocol and transmitted through data cables 140 and 145, circuit board 305, auxiliary post 230 and its corresponding ring 315 to the auxiliary lead in the trailer. The query may be a command to the ABS module to provide a status.

Regardless of the type of buses and whether PLC module 515 is included, note the advantages of the battery 510. Even with the trailer disconnected from the tractor's 7-way coupler or connected but with the auxiliary lead (the blue wire) in the tractor's 7-way coupler without power, telematics transceiver 525 may periodically wake up for an activity period to either listen for commands from a user such as downloaded from the cloud over a cellular link to the telematics transceiver 525 or to periodically wake up and provide a GPS location.

Lid circuit board 520 also contains a power management circuit 545. When auxiliary post 230 has power, power management circuit 545 is configured to use auxiliary post power from auxiliary post 230 as routed through the corresponding conductive ring 315, housing circuit board 305, and power cables 150 and 155 to power the remaining electronics on. Since the auxiliary post voltage is 12 V, power management circuit 545 may include a DC-DC switching power converter such as a buck converter to convert the 12 V into a lower, more suitable DC power supply voltage for the lid electronics.

Because the telematics is integrated into lid 110, a user may retrofit a conventional nose box with lid 110 should the user not desire the monitoring of the lamps as discussed with regard to circuit board 305 in housing 105. A conventional nose box housing may merely have the posts for a 7-way cabling to the trailer lamps and auxiliary circuit. Since there would be no circuit board 305 in such a conventional nose box house, data cable 145 may couple to an adapter to the blue (auxiliary) and ground posts within the housing.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A nose box, comprising:
    a housing;
    a platform within the housing, the platform including a first plurality of terminals for receiving lamp power signals from a tractor, a second plurality of terminals for transmitting the lamp power signals to a towable asset, and an auxiliary terminal for providing power to an auxiliary circuit in the towable asset;
    a housing circuit board associated with the platform, the housing circuit board including a plurality of lamp monitoring circuits, each lamp monitoring circuit being configured to conduct a respective one of the lamp power signals from a respective terminal from the first plurality of terminals to a respective terminals from the second plurality of terminals and to measure a current and a voltage of the respective lamp power signal to determine an operating condition of a respective lamp in the towable asset; and
    a lid for enclosing an interior of the housing, the lid including an inner cover configured to enclose a battery and a lid circuit board including a telematics transceiver and a power management circuit configured to power the telematics transceiver from the auxiliary terminal when the auxiliary terminal has power and to power the telematics transceiver from the battery when the auxiliary terminal does not have power.

2. The nose box of claim 1, wherein the telematics transceiver is configured to transmit the operating conditions from the plurality of lamp monitoring circuits.

3. The nose box of claim 1, wherein the platform is a post platform, the first plurality of terminals is a first plurality of posts, and the second plurality of terminals is a second plurality of posts, the nose box further comprising
    a data cable coupling between the housing circuit board and the lid circuit board, wherein the post platform includes a first plurality of data posts and the housing circuit board is configured to couple data signals from at least one sensor in the towable asset coupled to the first plurality of data posts to the data cable, and wherein the lid circuit board further includes a controller configured to receive data from at least one sensor through the data cable.

4. The nose box of claim 3, wherein the at least one sensor comprises a plurality of sensors and wherein the first plurality of data posts comprises a pair of control area network (CAN) data posts.

5. The nose box of claim 1, wherein the lid circuit board further includes a GPS receiver and a controller, and wherein the controller is configured to control the telematics transceiver to periodically transmit a location from the GPS receiver while the auxiliary terminal does not have power.

6. The nose box of claim 3, wherein the post platform is configured to seal the housing circuit board within the housing.

7. The nose box of claim 3, wherein each post in the first plurality of posts and in the second plurality of posts includes a front-side portion that extends from a front side of the post platform and includes a back-side portion that extends from a back side of the post platform, each back-side portion including a threaded bore; and wherein the housing circuit board includes a plurality of apertures configured to receive the back-side portion of each post, the housing circuit board including a plurality of conductive rings arranged so that each aperture is surrounded by a respective one of the conductive rings.

8. The nose box of claim 7, further comprising a plurality of screws corresponding to a plurality of the back-side portions, each screw extending from a back-side of the housing circuit board through a respective one of the apertures to be threadably engaged in the corresponding back-side portion's threaded bore to ensure an electrical connection between the aperture's conductive ring and the back-side portion.

9. The nose box of claim 6, wherein the first plurality of posts and the second plurality of posts each includes a brake light post, the nose box further comprising a cable coupled to a brake light post in the first plurality of posts, the auxiliary terminal being configured to provide back-up power to an ABS module in the towable asset.

10. The nose box of claim 3, wherein the post platform further includes at least one ground post.

11. The nose box of claim 1, further comprising:
    a power line communications module integrated onto the lid circuit board, the power line communications module being configured to communicate through the auxiliary terminal with an auxiliary circuit in the towable asset.

12. A method of operating a nose box, comprising:
    receiving a plurality of lamp power signals at a first plurality of posts;
    conducting each lamp power signal from a corresponding post in the first plurality of posts through a respective monitoring circuit to a corresponding post in a second plurality of posts to measure a voltage and a current of each lamp power signal to determine a status of a plurality of lamps in a towable asset;
    receiving an auxiliary power signal at an auxiliary power post and distributing the auxiliary power signal from the auxiliary power post through a power line coupled between the auxiliary power post and an anti-lock braking system module in the towable asset to power the auxiliary circuit;
    performing a power line communication with the anti-lock braking system module using the auxiliary power signal to obtain a status of the anti-lock braking system module auxiliary circuit; and
    transmitting the status of the plurality of lamps and the status of the anti-lock braking system module through a telematics transceiver to a user, wherein the telematics transceiver is integrated into the nose box.

13. The method of claim 12, wherein transmitting the status of the plurality of lamps and the status of the anti-lock braking system module through the telematics transceiver to the user comprises transmitting through a cellular transceiver.

14. The method of claim 12, further comprising:
determining a location of the towable asset; and
transmitting the locating of the towable asset through the telematics transceiver to the user.

15. The method of claim 14, further comprising:
powering the telematics transceiver using a battery responsive to an absence of the auxiliary power signal.

16. A nose box for a towable asset, comprising:
a housing including a plurality of lamp terminals and an auxiliary power terminal;
a battery;
a telematics transceiver;
a power management circuit; and
a lid for enclosing the plurality of lamp terminals and the auxiliary power terminal within the housing, the lid including an inner cover configured to enclose the battery, the telematics transceiver, and the power management circuit, wherein the power management circuit is configured to charge the battery from the auxiliary power terminal while the auxiliary power terminal has power, and wherein the power management circuit is further configured to power the telematics transceiver during an activity period using the battery while the auxiliary power terminal has no power.

17. The nose box of claim 16, further comprising:
a power line communication circuit, wherein the inner cover is further configured to enclose the power line communications circuit, the power line communications circuit being configured to communicate through the auxiliary power terminal with an auxiliary circuit in the towable asset, and wherein the telematics transceiver is configured to receive a status of the auxiliary circuit from the power line communications circuit and to transmit the status of the auxiliary circuit to a user.

18. The nose box of claim 16, further comprising:
a controller configured to interface through a data bus with at least one sensor in the towable asset, wherein the inner cover is further configured to enclose the controller.

19. The nose box of claim 16, further comprising:
a wireless communication module configured to communication with at least one sensor in the towable asset, wherein the inner cover is further configured to enclose the wireless communication module.

20. The nose box of claim 18, wherein the at least one sensor comprises a tire pressure monitoring system receiver.

* * * * *